US008880891B2

(12) United States Patent  
Liu et al.

(10) Patent No.: US 8,880,891 B2  
(45) Date of Patent: Nov. 4, 2014

(54) METHOD, SYSTEM AND APPARATUS FOR ESTABLISHING COMMUNICATION

(75) Inventors: Lifeng Liu, Shenzhen (CN); Dong Zhang, Shenzhen (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 562 days.

(21) Appl. No.: 12/976,701

(22) Filed: Dec. 22, 2010

(65) Prior Publication Data

US 2011/0093716 A1 Apr. 21, 2011

Related U.S. Application Data

(63) Continuation of application No. PCT/CN2009/072156, filed on Jun. 5, 2009.

(30) Foreign Application Priority Data

Jun. 30, 2008 (CN) .......................... 2008 1 0129174

(51) Int. Cl.
*H04L 9/32* (2006.01)
*H04L 29/06* (2006.01)

(52) U.S. Cl.
CPC ........... *H04L 63/126* (2013.01); *H04L 2209/20* (2013.01); *H04L 9/3247* (2013.01); *H04L 63/0869* (2013.01); *H04L 63/1458* (2013.01)
USPC ........................................................ 713/176

(58) Field of Classification Search
USPC ........................ 713/151, 153, 160, 162, 168
See application file for complete search history.

(56) References Cited

U.S. PATENT DOCUMENTS

| 2004/0111635 | A1 | 6/2004 | Boivie et al. |
| 2007/0036110 | A1* | 2/2007 | Preguica ....................... 370/331 |
| 2007/0113075 | A1 | 5/2007 | Jo et al. |
| 2008/0137659 | A1* | 6/2008 | Levy-Abegnoli et al. ..... 370/392 |
| 2009/0073935 | A1* | 3/2009 | Xia et al. ....................... 370/331 |

FOREIGN PATENT DOCUMENTS

| CN | 1505308 A | 6/2004 |
| CN | 1921488 A | 2/2007 |
| CN | 101106568 A | 1/2008 |
| CN | 101299668 A | 11/2008 |
| CN | 101404579 A | 4/2009 |
| WO | WO 2010/000171 A1 | 1/2010 |

OTHER PUBLICATIONS

Nikander, Secure Neighbor Discovery using separate CGA extension header draft-nikander-send-ipsec-00.txt, Jun. 19, 2003.*

(Continued)

*Primary Examiner* — Brandon Hoffman  
(74) *Attorney, Agent, or Firm* — Brinks Gilson & Lione (57) ABSTRACT

A method, a system, and an apparatus for establishing communication are disclosed. The method is invented to establish communication between at least two communication parties including a first communication party and a second communication party. The method includes: sending a Cryptographically Generated Address (CGA) request to the first communication party; receiving CGA parameters and a CGA signature returned by the first communication party; and authenticating the CGA parameters and the CGA signature, and establishing communication with the first communication party if the authentication succeeds. By using the method disclosed herein, in the process of establishing communication, the communication party authenticates the CGA parameters and CGA signature carried in the CGA extension header to determine authenticity of the CGA, thus preventing the IP address spoofing and preventing or mitigating the network security problems caused by the IP address spoofing.

10 Claims, 7 Drawing Sheets

(56) References Cited

OTHER PUBLICATIONS

Extended European Search Report issued in corresponding European Patent Application No. 09771941.3, mailed Feb. 20, 2012.
Written Opinion of the International Searching Authority issued in corresponding PCT Patent Application No. PCT/CN2009/072156, mailed Sep. 10, 2009.
Office Action issued in corresponding Chinese Patent Application No. 200810129174.2, mailed Apr. 25, 2011.
Arkko et al., "Enhanced Route Optimization for Mobile IPv6" Network Working Group, May 2007.
Arkko et al., "SEcure Neighbor Discovery (SEND)" Network Working Group, Mar. 2005.
Aura, "Cryptographically Generated Addresses (CGA)" Network Working Group, Mar. 2005.
Lifeng, et al., "CGA Extension Header of IPv6" Network Working Group, Oct. 24, 2008.
First Office Action issued in corresponding Chinese Patent Application No. 200810129174.2, mailed Mar. 8, 2010.
Second Office Action issued in corresponding Chinese Patent Application No. 200810129174.2, mailed Oct. 13, 2010.
Zhang et al., "Cryptographically Generated Address (CGA) Extension Header for Internet Protocol version 6 (IPv6)", Network Working Group Internet Draft. Jul. 12, 2010.

* cited by examiner

```
+-+-+-+-+-+-+-+-+-+-+-+-+-+-+-+-+-+-+-+-+-+-+-+-+-+-+-+-+-+-+-+-+
|     Type      |    Length     |  Pad Length   |   Reserved    |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                                                               |
.                                                               .
.                        Parameter field                        .
.                                                               .
|                                                               |
+-+-+-+-+-+-+-+-+-+-+-+-+-+-+-+-+-+-+-+-+-+-+-+-+-+-+-+-+-+-+-+-+
|                                                               |
.                         Padding field                         .
|                                                               |
+-+-+-+-+-+-+-+-+-+-+-+-+-+-+-+-+-+-+-+-+-+-+-+-+-+-+-+-+-+-+-+-+
```

FIG. 6

```
+-+-+-+-+-+-+-+-+-+-+-+-+-+-+-+-+-+-+-+-+-+-+-+-+-+-+-+-+-+-+-+-+
|     Type      |    Length     |  Pad Length   |   Reserved    |
+-+-+-+-+-+-+-+-+-+-+-+-+-+-+-+-+-+-+-+-+-+-+-+-+-+-+-+-+-+-+-+-+
|                                                               |
.                                                               .
.                        Signature field                        .
.                                                               .
|                                                               |
+-+-+-+-+-+-+-+-+-+-+-+-+-+-+-+-+-+-+-+-+-+-+-+-+-+-+-+-+-+-+-+-+
|                                                               |
.                         Padding field                         .
|                                                               |
+-+-+-+-+-+-+-+-+-+-+-+-+-+-+-+-+-+-+-+-+-+-+-+-+-+-+-+-+-+-+-+-+
```

METHOD, SYSTEM AND APPARATUS FOR ESTABLISHING COMMUNICATION

CROSS-REFERENCE TO RELATED APPLICATIONS

This application is a continuation of International Application No. PCT/CN2009/072156, filed on Jun. 5, 2009, which claims priority to Chinese Patent Application No. 200810129174.2, filed on Jun. 30, 2008, both of which are hereby incorporated by reference in their entireties.

FIELD OF THE DISCLOSURE

The present disclosure relates to communication technologies, and in particular, to a method, a system, and an apparatus for establishing communication.

BACKGROUND

Internet Protocol (IP) address spoofing is partly allowed in IP addresses, sub-network segments, and autonomous systems. Therefore, the Internet is vulnerable to IP address spoofing, and frequent IP address spoofing is a peril. Some examples are provided below:

(a) From the capability of faking the source address, network attacks are derived, for example, a response attack and a man-in-the-middle attack.

(b) The fake source address may implement other forms of attacks, for example, Distributed Denial of Service (DDOS) attacks, which are hardly detectable.

(c) With the fake source address being allowed to access the network, it is impossible to know the source of an IP packet through the source address.

In the prior art, Unicast Reverse Path Forwarding (URPF) is a good solution to tackling IP address spoofing. The URPF sets the following packet forwarding mechanism: When receiving a packet, the router checks the routing table to determine whether the route for returning the packet to the source IP address passes through the interface that receives the packet; if so, and the router forwards the packet, or if not, the router discards the packet.

In the process of implementing the present invention, the inventor finds at least the following problems in the prior art:

The URPF for blocking the attacks of the fake source IP address at the network border does not work for the current DDoS because the basic principle of the URPF is: The router judges the source address of the egress traffic, and blocks the egress traffic if the source address of the egress traffic is not an internal subnet address. However, an attacker may fake the IP address in the subnet of the attacker to launch DDoS attacks to override the URPF protection policy. Therefore, the prior art is unable to block the packet that carries a fake source address.

SUMMARY

The embodiments of the present invention provide a method, a system, and an apparatus for establishing communication to authenticate the address and prevent IP address spoofing through Cryptographically Generated Address (CGA) parameters and a CGA signature.

A method for establishing communication is provided in an embodiment of the present invention to establish communication between at least two communication parties including a first communication party and a second communication party. The method includes: sending a CGA request to the first communication party; receiving CGA parameters and a CGA signature of the first communication party; and authenticating the CGA parameters and the CGA signature, and establishing communication with the first communication party if the authentication succeeds.

A system for establishing communication in an embodiment of the present invention includes: a first communication party, configured to receive a CGA request and return CGA parameters and a CGA signature; and a second communication party, configured to: send the CGA request to the first communication party, receive the CGA parameters and CGA signature of the first communication party, authenticate the CGA parameters and CGA signature, and establish communication with the first communication party if the authentication succeeds.

A communication device provided in an embodiment of the present invention includes: a sending module, configured to send a CGA request to a second communication device; a receiving module, configured to receive CGA parameters and a CGA signature of the second communication device; an authenticating module, configured to authenticate the CGA parameters and CGA signature received by the receiving module; and a communication establishing module, configured to establish communication with the second communication device if the authenticating module succeeds in the authentication.

A transmission frame format is provided in an embodiment of the present invention. The transmission frame format includes CGA request data and is configured to transmit a CGA request between two communication parties. The transmission frame format includes a Type field and a Reserved field.

BRIEF DESCRIPTION OF THE DRAWINGS

To describe the technical solution under the present invention more clearly, the following describes the accompanying drawings involved in the embodiments of the present invention. Apparently, the accompanying drawings described below are not exhaustive, and persons of ordinary skill in the art can derive other drawings from such accompanying drawings without any creative effort.

DETAILED DESCRIPTION OF THE EMBODIMENTS

The following detailed description is provided with reference to the accompanying drawings to provide a thorough understanding of the present invention. Evidently, the drawings and the detailed description are merely representative of particular embodiments of the present invention, and the embodiments are illustrative in nature and not exhaustive. All other embodiments, which can be derived by those skilled in the art from the embodiments provided herein without any creative effort, fall within the scope of the present invention.

A method for establishing communication in an embodiment of the present invention prevents IP address spoofing such as IP address faking, and prevents or mitigates a series of network security problems caused by IP address spoofing.

In this embodiment, a CGA extension header is added to the Internet Protocol version 6 (IPv6) extension header. The CGA extension header includes a CGA request, CGA parameters (CGA Params), and a CGA signature (CGA Sig).

Figure 1:
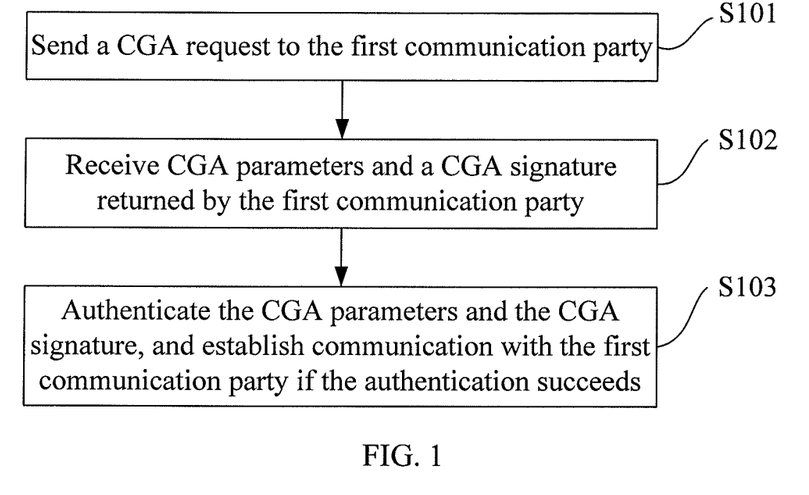
FIG. 1 is a flowchart of a method for establishing communication in an embodiment of the present invention.

FIG. 1 is a flowchart of a method for establishing communication in an embodiment of the present invention. The method includes the following steps:

S101. Send a CGA request to the first communication party, as detailed below:

The second communication party receives the session request sent by the first communication party, and checks the session request. When the IPv6 extension header in the session request includes no CGA extension header, or the session request includes a CGA extension header with null content, the second communication party sends a CGA request to the first communication party.

S102. Receive CGA parameters and a CGA signature returned by the first communication party.

After receiving the CGA request sent by the second communication party, the first communication party returns CGA parameters and a CGA signature to the second communication party. In this embodiment, a CGA extension header is added to the IPv6 extension header, and the CGA parameters and CGA signature returned by the first communication party are carried in the CGA extension header of the IPv6 extension header.

S103. Authenticate the CGA parameters and the CGA signature, and establish communication with the first communication party if the authentication succeeds.

In addition, when the second communication party receives the CGA parameters and CGA signature returned by the first communication party, the second communication party may receive the CGA request sent by the first communication party. After authenticating the CGA parameters and CGA signature returned by the first communication party successfully, the second communication party returns the CGA parameters and CGA signature of the second communication party to the first communication party. After the first communication party authenticates the CGA parameters and CGA signature of the second communication party successfully, communication is established between the second communication party and the first communication party. By now, the authenticity of the CGA is authenticated reciprocally between the first communication party and the second communication party.

By using the method for establishing communication above, in the process of establishing communication, the communication party authenticates the CGA parameters and CGA signature carried in the CGA extension header to determine authenticity of the CGA, thus preventing the IP address spoofing and preventing or mitigating some network security problems caused by the IP address spoofing.

Figure 2:
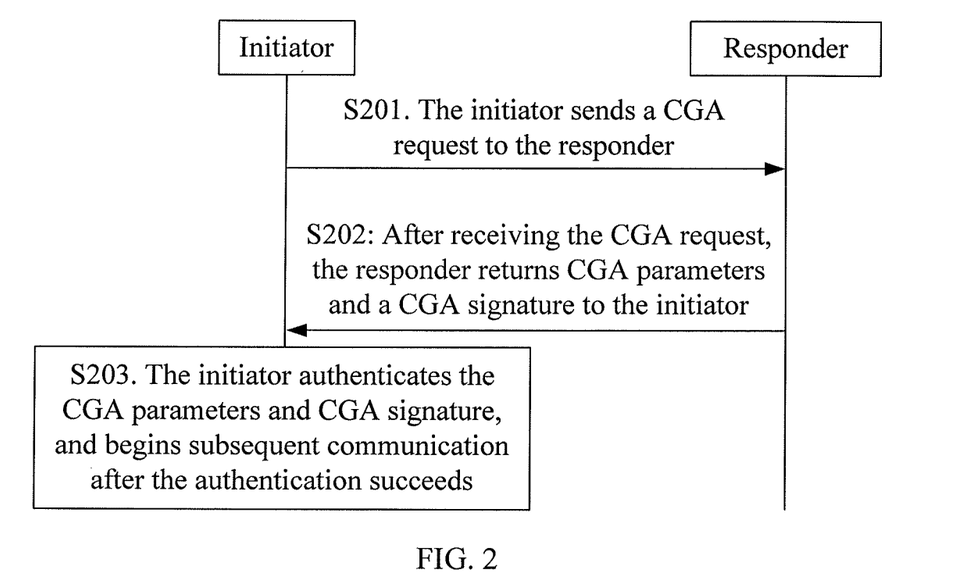
FIG. 2 is a flowchart of a method for establishing communication in a first embodiment of the present invention.

FIG. 2 is a flowchart of a method for establishing communication in the first embodiment of the present invention. In the first embodiment, the second communication party is an initiator, and the first communication party is a responder. Specifically, the method includes the following steps:

S201. The initiator sends a CGA request to the responder.

S202. After receiving the CGA request, the responder returns CGA parameters and a CGA signature to the initiator.

S203. The initiator authenticates the CGA parameters and CGA signature, and begins subsequent communication after the authentication succeeds. If the authentication fails, the communication process ends.

In the method for establishing communication above, the initiator sends a CGA request to the responder. After receiving the CGA parameters and CGA signature returned by the responder, the initiator authenticates the CGA parameters and CGA signature to verify authenticity of the CGA of the responder, thus preventing the IP address spoofing and preventing or mitigating the network security problems caused by the IP address spoofing.

Figure 3:
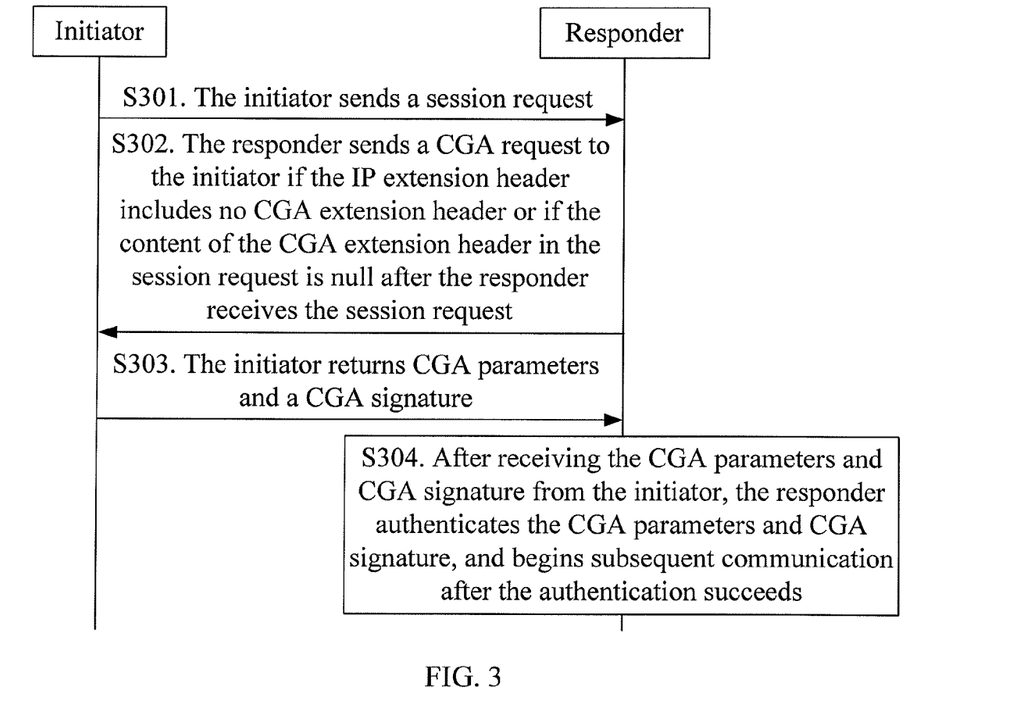
FIG. 3 is a flowchart of a method for establishing communication in a second embodiment of the present invention.

FIG. 3 is a flowchart of a method for establishing communication in the second embodiment of the present invention. In the second embodiment, the first communication party is an initiator and the second communication party is a responder. The method includes the following steps:

S301. The initiator sends a session request.

S302. After receiving the session request, the responder checks whether the IP extension header carries a CGA extension header. If so, the responder judges whether the content of the CGA extension header is null, and performs step S304 if the content of the CGA extension header is not null. If the IP extension header includes no CGA extension header, or the content of the CGA extension header in the session request is null, the responder sends a CGA request to the initiator.

S303. The initiator receives a CGA request. If the initiator supports the CGA extension, the initiator returns CGA parameters and a CGA signature; if the initiator does not support the CGA extension, the initiator discards the CGA request.

S304. After receiving the CGA parameters and CGA signature from the initiator, the responder authenticates the CGA parameters and CGA signature, and begins subsequent communication after the authentication succeeds. If the authentication fails, the responder discards the CGA parameters and CGA signature returned by the initiator.

In the method for establishing communication above, after receiving the session request from the initiator, the responder sends a CGA request to the initiator, and authenticates the CGA parameters and CGA signature returned by the initiator to verify authenticity of the CGA of the initiator, thus preventing the IP address spoofing and preventing or mitigating the network security problems caused by the IP address spoofing.

Figure 4:
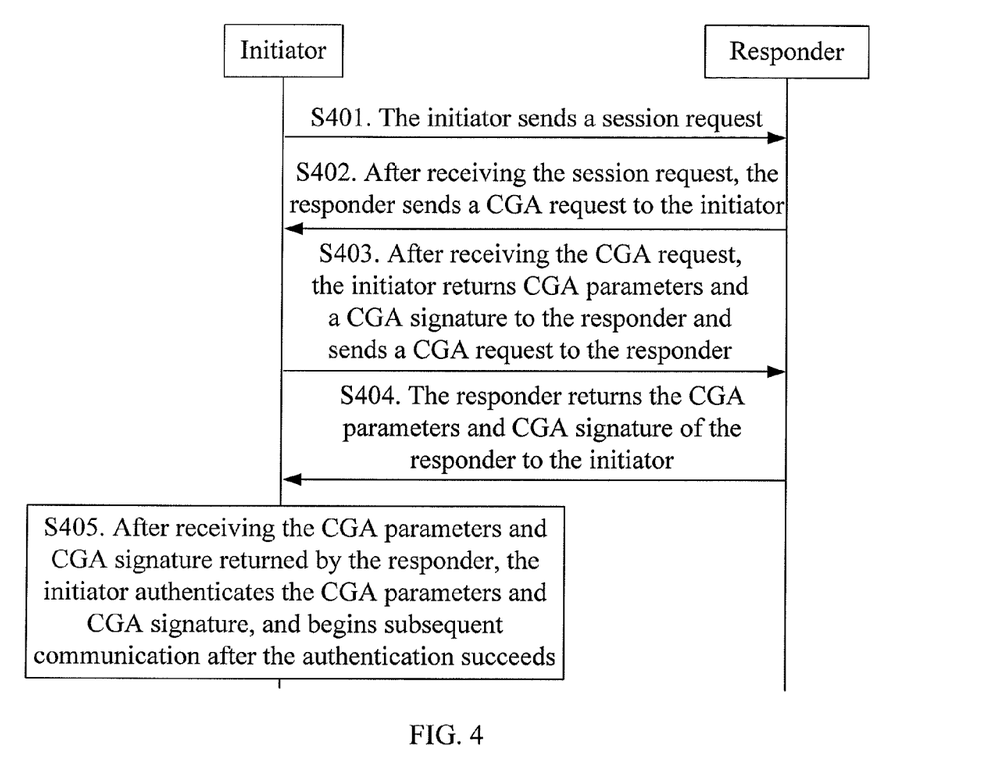
FIG. 4 is a flowchart of a method for establishing communication in a third embodiment of the present invention.

FIG. 4 is a flowchart of a method for establishing communication in the third embodiment of the present invention. In the third embodiment, the first communication party is an initiator and the second communication party is a responder. The method includes the following steps:

S401. The initiator sends a session request. The session request includes a CGA extension header with null content.

S402. After receiving the session request, the responder sends a CGA request to the initiator.

S403. After receiving the CGA request, the initiator returns CGA parameters and a CGA signature to the responder and sends a CGA request to the responder.

S404. After receiving the CGA request sent by the initiator, the responder authenticates the CGA parameters and CGA signature returned by the initiator. If the authentication succeeds, the responder returns the CGA parameters and CGA signature of the responder to the initiator; if the authentication fails, the responder discards the CGA parameters, CGA signature and CGA request sent by the initiator.

S405. After receiving the CGA parameters and CGA signature returned by the responder, the initiator authenticates the CGA parameters and CGA signature, and begins subsequent communication after the authentication succeeds. If the authentication fails, the initiator discards the CGA parameters and CGA signature.

In the method for establishing communication above, after receiving the session request from the initiator, the responder sends a CGA request to the initiator, and authenticates the CGA parameters and CGA signature returned by the initiator; at the same time, the initiator sends a CGA request to the responder, and authenticates the CGA parameters and CGA signature returned by the responder. The initiator and the responder verify the authenticity of the CGA reciprocally, thus preventing the IP address spoofing and preventing or mitigating the network security problems caused by the IP address spoofing.

In this embodiment, a CGA extension header is added. In the process of establishing communication, the communication party needs to add the extension header that carries the CGA parameters and CGA signature to the message. The extension header is designed to authenticate the authenticity of the CGA, to prevent the IP address spoofing and to prevent or mitigate the network security problems caused by the IP address spoofing.

Taking the Transmission Control Protocol (TCP)-Synchronization (SYN) flood attack as an example, the attacker uses a botnet to send plenty of SYN requests from fake addresses.

Through this embodiment, after receiving the SYN request, the server checks whether the SYN request carries any CGA extension header before returning a SYN-ACK and establishing a half-connect state. (1) If the SYN request carries no CGA extension header, the server sends a CGA request and does not need to establish state information for the SYN request. Because the source address in the SYN request is fake, the server receives no more response. (2) If the SYN request carries a CGA extension header, the server verifies the authenticity of the CGA first. If the source address in the SYN request is fake, the server can know that the SYN request is fake through a simple Hash operation only, and discard the SYN request. Through this embodiment, although the server still needs to consume resources for the SYN request from a fake address, few resources are consumed because it is not necessary to return a SYN-ACK or establish or maintain the half-connect state for the request sent from the fake address. Therefore, the TCP-SYN flood attack is overcome to a great extent.

The following description takes a man-in-the-middle as an example:

"Man-in-the-middle" (host C, attacker) is located between the communication initiator (host A) and the responder (host B), and communicates with host A and host B respectively by faking the address of the initiator and the address of the responder. If host A knows the address of host B, when this embodiment is applied, the attacker is unable to tamper the message sent by host B to host A because the identity of host B is bound to the CGA through the CGA signature. The attacker does not know the private key of host B, and cannot obtain the correct signature required in the tampered message.

In this embodiment, a CGA extension header is added to the IPv6 extension header. The CGA extension header includes a CGA request, CGA parameters, and a CGA signature. In another embodiment, the CGA-related information may be carried in a Destination Options header of the existing IPv6. The CGA-related information includes a CGA request, CGA parameters, and a CGA signature.

A transmission frame format is provided in an embodiment of the present invention. The transmission frame format includes CGA request data, and is designed to transmit a CGA request between two communication parties in the process of establishing communication between the two communication parties through the communication establishing method provided herein. In the communication process, either party can request the CGA parameters and CGA signature from the opposite party by sending an IP packet that carries the CGA request options. The communication party that receives the IP packet needs to return a packet that carries the CGA parameters and CGA signature.

Figure 5:
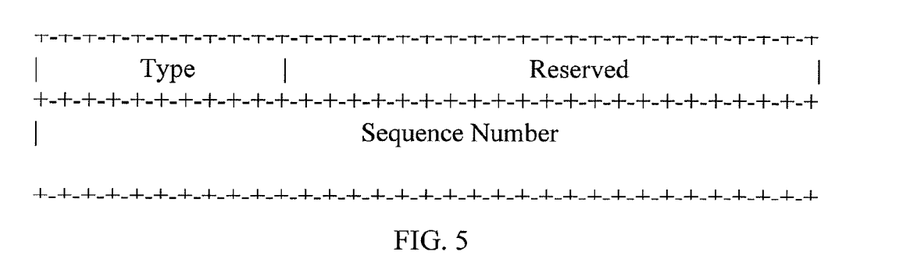
FIG. 5 shows a transmission frame format provided in an embodiment of the present invention.

The format of the CGA request options put forward in this embodiment is shown in FIG. 5. The CGA request options include the following fields:

Type field: This field is an 8-bit unsigned integer. In this embodiment, when the value of this Type field is 193, it indicates that the packet is a CGA request. In other embodiments, another value may be used to indicate that the packet is a CGA request.

Reserved field: The length of this field is 24 bits, which are reserved for future extension. This Reserved field must be set to 0.

Sequence Number field: The Sequence Number field is a 32-bit random number, and includes information for preventing replay attacks.

A transmission frame format is provided in an embodiment of the present invention. The transmission frame format includes CGA parameter data, and is designed to transmit CGA parameters between two communication parties in the process of establishing communication between the two communication parties through the communication establishing method provided herein. The communication party that receives the CGA parameters authenticates the CGA according to the CGA parameters.

Figure 6:
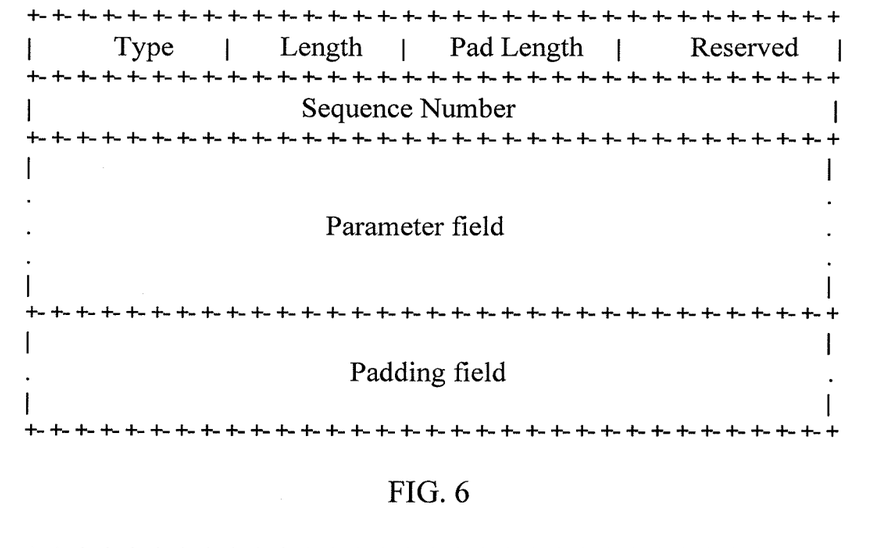
FIG. 6 shows another transmission frame format provided in an embodiment of the present invention.

The format of the CGA parameter options put forward in this embodiment is shown in FIG. 6. The CGA parameter options include the following fields:

Type field: This field is an 8-bit unsigned integer. In this embodiment, when the value of this Type field is 194, it indicates that the packet carries CGA parameters. In other embodiments, another value may be used to indicate that the packet carries CGA parameters.

Length field: This field is an 8-bit unsigned integer for indicating the length of all CGA parameters in octets. The length of this field is the sum of length of these fields: Type field, Length field, Pad Length field, Reserved field, Sequence Number field, CGA parameter field, and Padding field. In another embodiment, the Length field may be measured in octets.

Pad Length field: This field is an 8-bit unsigned integer indicating the length of the Padding field in octets.

Reserved field: The length of this field is 8 bits, which are reserved for future extension. This Reserved field must be set to 0.

Sequence Number field: The Sequence Number field is a 32-bit integer, and includes information for preventing replay attacks. If the CGA parameters are designed to respond to the CGA request, the value of the Sequence Number field is the value of the sequence number in the CGA request plus 1; otherwise, this Sequence Number field is set to 0.

Parameter field: The length of this field is variable, and this field carries CGA parameter information.

Padding field: The length of this field is variable, and this field makes the packet length an integral multiple of octets. The content of this Padding field must be 0.

Another transmission frame format is provided in an embodiment of the present invention. The transmission frame format includes CGA signature data, and is designed to transmit a CGA signature between two communication parties in the process of establishing communication between the two communication parties through the communication establishing method provided herein. The CGA signature is affixed to the packet through a private key corresponding to the public key in the CGA parameters.

Figure 7:
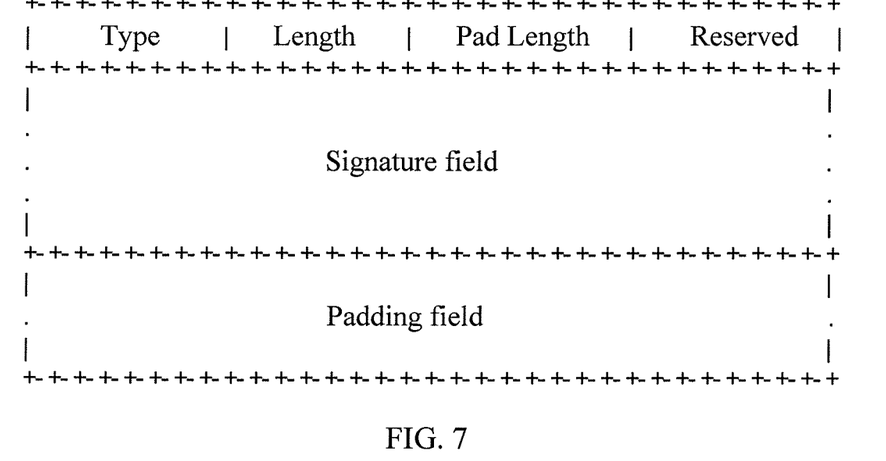
FIG. 7 shows another transmission frame format provided in an embodiment of the present invention.

The format of the CGA signature options put forward in this embodiment is shown in FIG. 7. The CGA signature options include the following fields:

Type field: This field is an 8-bit unsigned integer. In this embodiment, when the value of this Type field is 195, it indicates that the packet carries a CGA signature. In other embodiments, another value may be used to indicate that the packet is a CGA signature.

Length field: This field is an 8-bit unsigned integer for indicating the length of the whole CGA signature in octets. The length of this field is the sum of length of these fields: Type field, Length field, Pad Length field, Reserved field, CGA signature field, and Padding field.

Pad Length field: This field is an 8-bit unsigned integer indicating the length of the Padding field in octets.

Reserved field: The length of this field is 8 bits, which are reserved for future extension. This Reserved field must be set to 0.

Signature field: The length of this field is variable, and this field includes the signature affixed to the packet content through a private key of the sender.

Padding field: The length of this field is variable, and this field makes the packet length an integral multiple of octets. The content of this Padding field must be 0.

Figure 8:
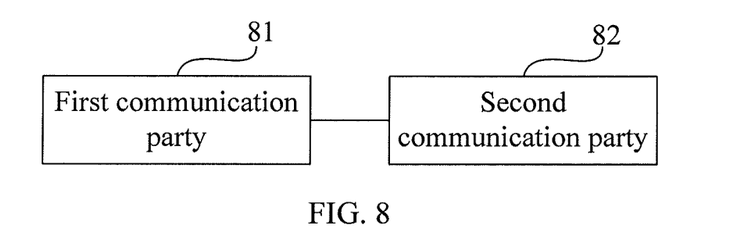
FIG. 8 shows a structure of a system for establishing communication in an embodiment of the present invention.

FIG. 8 shows a structure of a system for establishing communication in an embodiment of the present invention. The system includes:

a first communication party 81, configured to receive a CGA request and return CGA parameters and a CGA signature; and a second communication party 82, configured to: send the CGA request to the first communication party 81, receive the CGA parameters and CGA signature returned by the first communication party 81, authenticate the CGA parameters and CGA signature, and establish communication with the first communication party 81 if the authentication succeeds.

Figure 9:
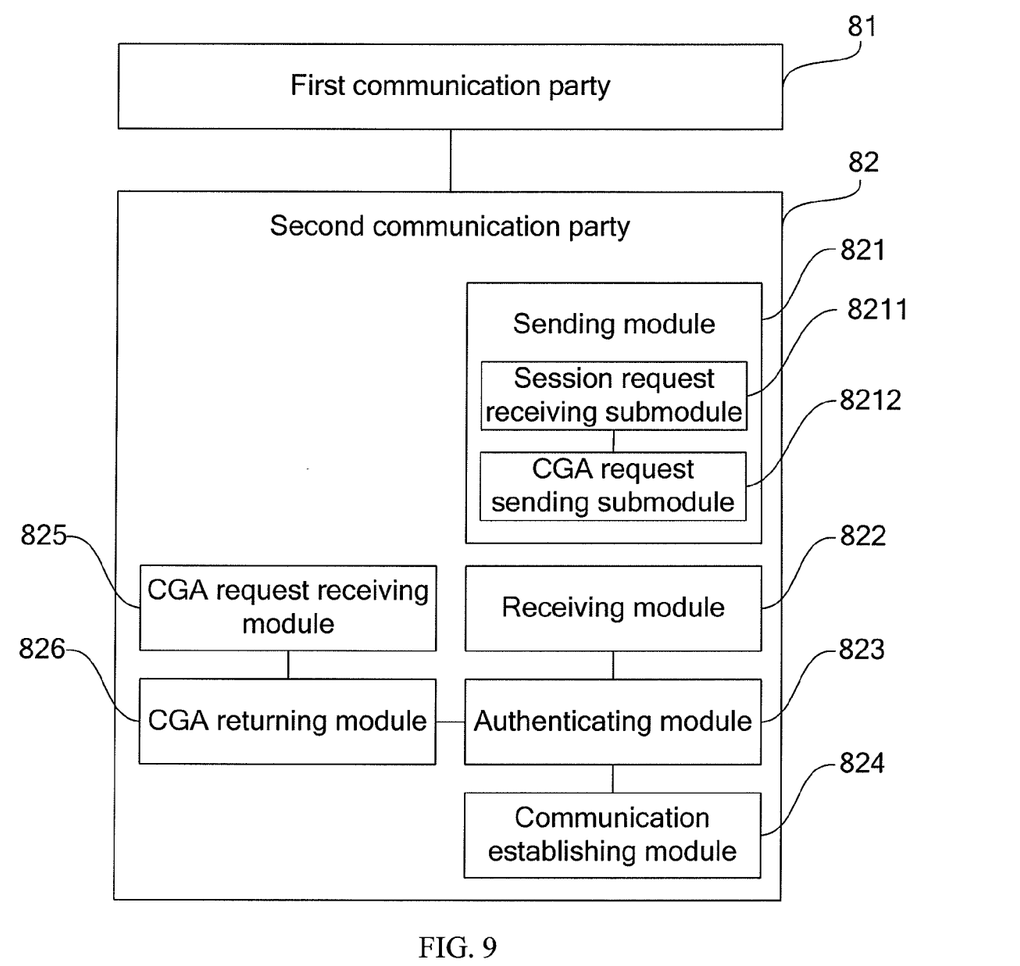
FIG. 9 shows another structure of a system for establishing communication in an embodiment of the present invention.

As shown in FIG. 9, in another embodiment of the present invention, the second communication party 82 may include:

a sending module 821, configured to send a CGA request to the first communication party 81;

a receiving module 822, configured to receive CGA parameters and a CGA signature returned by the first communication party 81;

an authenticating module 823, configured to authenticate the CGA parameters and CGA signature received by the receiving module 822; and a communication establishing module 824, configured to establish communication with the first communication party 81 if the authenticating module 823 succeeds in the authentication.

The sending module 821 may include:

a session request receiving submodule 8211, configured to receive a session request sent by the first communication party 81;

a CGA request sending submodule 8212, configured to send a CGA request to the first communication party 81 if the IPv6 extension header in the session request received by the session request receiving submodule 8211 includes no CGA extension header, or if the session request includes a CGA extension header whose content is null, or if the IPv6 extension header of the session request includes no Destination Options header, or if the Destination Options header in the IPv6 extension header of the session request includes no CGA-related information.

The second communication party 82 may further include:

a CGA request receiving module 825, configured to receive a CGA request sent by the first communication party 81 when the receiving module 822 receives the CGA parameters and CGA signature returned by the first communication party 81; and a CGA returning module 826, configured to return the CGA parameters and CGA signature of the second communication party 82 to the first communication party 81 after the CGA request receiving module 825 receives the CGA request sent by the first communication party 81 and the authenticating module 823 authenticates the CGA parameters and CGA signature successfully.

Through the system for establishing communication above, in the process of establishing communication, the second communication party 82 authenticates the CGA parameters and CGA signature returned by the first communication party 81 to determine authenticity of the CGA of the first communication party 81, thus preventing the IP address spoofing and preventing or mitigating the network security problems caused by the IP address spoofing.

Figure 10:
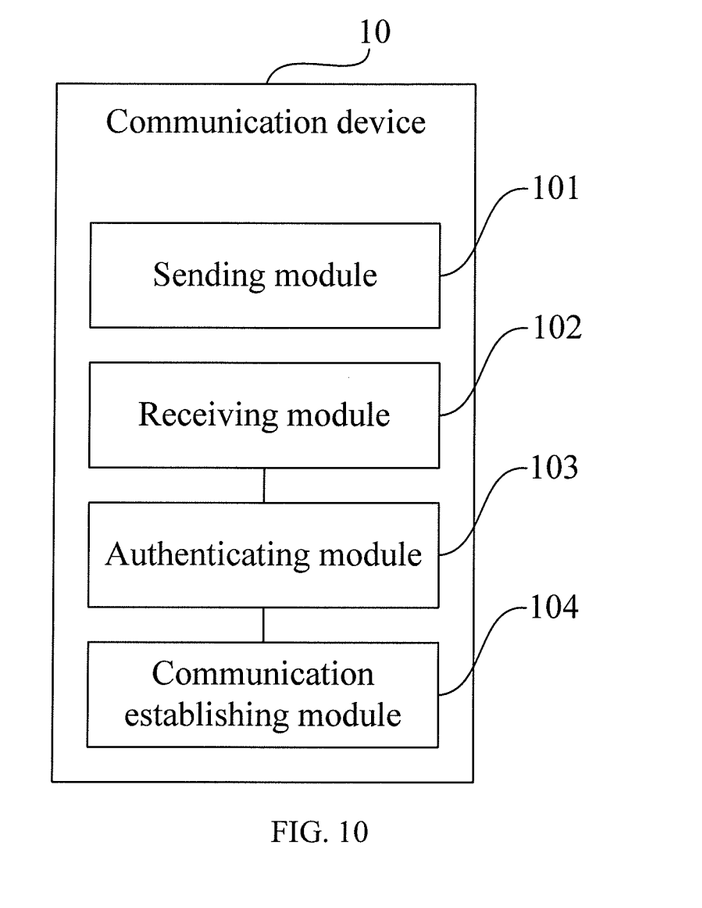
FIG. 10 shows a structure of a communication device in an embodiment of the present invention.

FIG. 10 shows a structure of a communication device 10 in an embodiment of the present invention. The communication device 10 includes:

a sending module 101, configured to send a CGA request to a second communication device;

a receiving module 102, configured to receive CGA parameters and a CGA signature returned by the second communication device;

an authenticating module 103, configured to authenticate the CGA parameters and CGA signature received by the receiving module 102; and a communication establishing module 104, configured to establish communication with the second communication device if the authenticating module 103 succeeds in the authentication.

Figure 11:
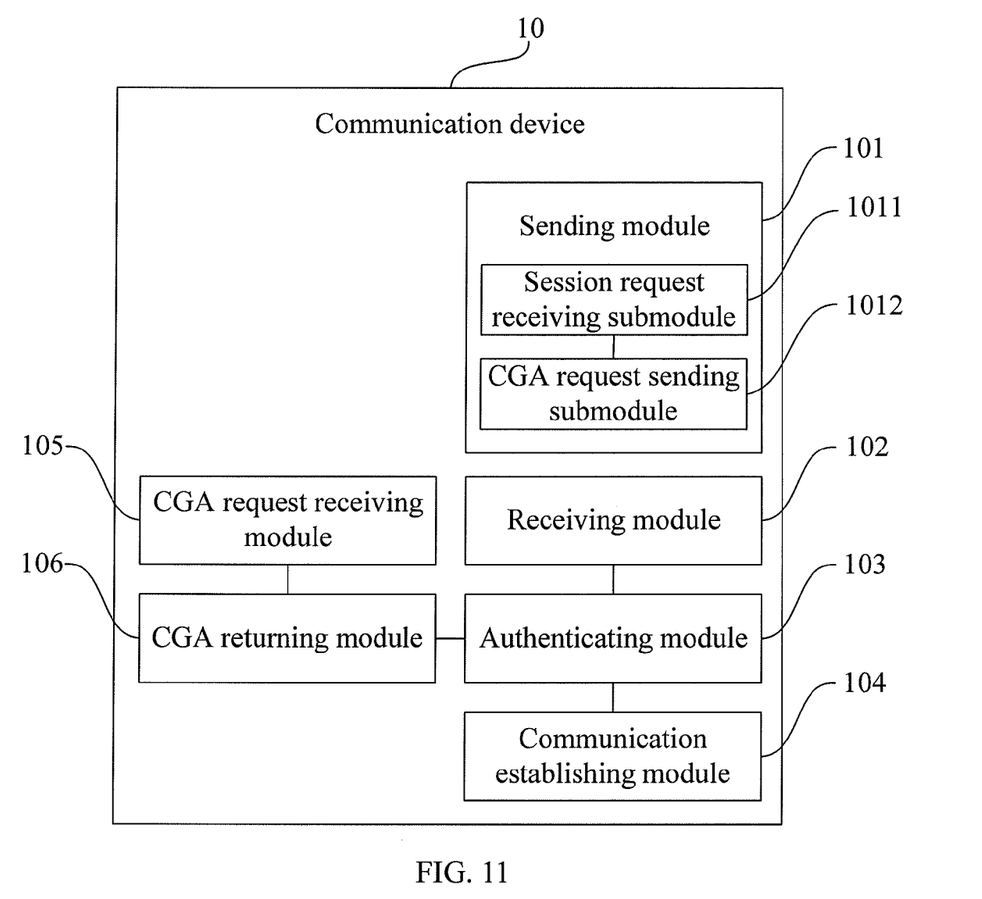
FIG. 11 shows another structure of a communication device in an embodiment of the present invention.

As shown in FIG. 11, in another embodiment of the present invention, the sending module 101 may include:

a session request receiving submodule 1011, configured to receive a session request sent by the second communication device;

a CGA request sending submodule 1012, configured to send a CGA request to the second communication device if the IPv6 extension header in the session request received by the session request receiving submodule 1011 includes no CGA extension header, or if the session request includes a CGA extension header whose content is null, or if the IPv6 extension header of the session request includes no Destination Options header, or if the Destination Options header in the IPv6 extension header of the session request includes no CGA-related information.

The communication device 10 may further include:

a CGA request receiving module 105, configured to receive a CGA request sent by the second communication device when the receiving module 102 receives the CGA parameters and CGA signature returned by the second communication device; and a CGA returning module 106, configured to return the CGA parameters and CGA signature of the communication device to the second communication device after the CGA request receiving module 105 receives the CGA request sent by the second communication device and the authenticating module 103 authenticates the CGA parameters and CGA signature successfully.

When the foregoing communication device establishes communication with the second communication device, the sending module 101 sends a CGA request to the second communication device, and the receiving module 102 receives the CGA parameters and CGA signature returned by the second communication device, and the authenticating module 103 authenticates the CGA parameters and CGA signature received by the receiving module 102 to determine authenticity of the CGA of the first communication party 51. After the authenticating module 103 authenticates the CGA successfully, the communication establishing module 104 establishes communication with the second communication device. The communication device in this embodiment prevents IP address spoofing, and prevents or mitigates network security problems caused by the IP address spoofing.

After reading the foregoing embodiments, those skilled in the art are clearly aware that the present invention may be implemented through hardware, or through software in addition to a necessary universal hardware platform. Therefore, the technical solution under the present invention may be embodied as a software product. The software product may be stored in a non-volatile storage medium (such as a Compact Disk-Read Only Memory (CD-ROM), a Universal Serial Bus (USB) flash disk, or a mobile hard disk), and may include several instructions that enable a computer device (such as a personal computer, a server, or a network device) to perform the methods provided in any embodiment of the present invention.

It is understandable to those skilled in the art that the accompanying drawings are only schematic diagrams of the preferred embodiments, and the modules or processes in the accompanying drawings are not mandatory for implementing the present invention.

It is understandable to those skilled in the art that the modules in an apparatus provided in an embodiment of the present invention may be distributed into the apparatus described herein, or may be located in one or more apparatuses different from the apparatus described herein. The modules may be combined into one module, or split into multiple submodules.

The sequence number of an embodiment above is for ease of description and does not represent the order of preference.

The preceding descriptions are merely preferred embodiments of the present invention, but not intended to limit the scope of the present invention. Any modifications or variations that can be derived by those skilled in the art shall fall within the scope of the present invention.

What is claimed is:

1. A method for establishing communication between at least two communication parties comprising a first communication party and a second communication party, comprising:
    sending, by the second communication party, a first Cryptographically Generated Address (CGA) request to the first communication party;
    receiving, by the second communication party, CGA parameters and a CGA signature of the first communication party which sent from the first communication party as a response to the first CGA request, wherein the CGA parameters and CGA signature are carried in a Destination Options header of an IPv6 extension header of the response; and
    authenticating, by the second communication party, the CGA parameters and the CGA signature, and establishing communication with the first communication party if the authentication succeeds.

2. The method for establishing communication according to claim 1, wherein:
    before the sending the first CGA request to the first communication party, the method further comprises:
    receiving, by the second communication party, a session request sent by the first communication party, and sending the CGA request to the first communication party when the IPv6 extension header in the session request comprises no Destination Options header.

3. The method for establishing communication according to claim 1, wherein:
    before the sending the first CGA request to the first communication party, the method further comprises:
    receiving, by the second communication party, a session request sent by the first communication party, and sending the CGA request to the first communication party when the Destination Options header of the Internet Protocol version 6 (IPv6) extension header in the session request comprises no CGA-related information.

4. The method for establishing communication according to claim 1, comprising:
    receiving, by the second communication party, a second CGA request sent by the first communication party when receiving the CGA parameters and the CGA signature of the first communication party;
    returning, by the second communication party, CGA parameters and CGA signature of the second communication party to the first communication party after authenticating the CGA parameters and CGA signature of the first communication party successfully; and
    establishing communication between the second communication party and the first communication party after the first communication party authenticates the CGA parameters and CGA signature of the second communication party successfully.

5. A communication device, comprising:
    a sending module, configured to send a first Cryptographically Generated Address (CGA) request to a second communication device;
    a receiving module, configured to receive CGA parameters and a CGA signature of the second communication device which sent from the second communication party as a response to the first CGA request, wherein the CGA parameters and CGA signature are carried in a Destination Options header of an IPv6 extension header of the response;
    an authenticating module, configured to authenticate the CGA parameters and CGA signature received by the receiving module; and
    a communication establishing module, configured to establish communication with the second communication device if the authenticating module succeeds in the authentication.

6. The communication device according to claim 5, wherein the sending module comprises:
    a session request receiving submodule, configured to receive a session request sent by the second communication device; and
    a CGA request sending submodule, configured to send the CGA request to the second communication device when the IPv6 extension header of the session request comprises no Destination Options header, or when the Destination Options header in the IPv6 extension header of the session request comprises no CGA-related information.

7. The communication device according to claim 5, further comprising:
- a CGA request receiving module, configured to receive a second CGA request sent by the second communication device when the receiving module receives the CGA parameters and CGA signature of the second communication device; and
- a CGA returning module, configured to return the CGA parameters and CGA signature of the communication device to the second communication device after the CGA request receiving module receives the second CGA request sent by the second communication device and the authenticating module authenticates the CGA parameters and CGA signature successfully.

8. A system for establishing communication, comprising a first communication party and a second communication party, wherein the second communication party being the communication device according to claim 5:
- the first communication party, configured to receive a Cryptographically Generated Address (CGA) request and return CGA parameters and a CGA signature; and
- the second communication party, configured to: receive a session request sent by the first communication party, send the CGA request to the first communication party when the IPv6 extension header of the session request comprises no Destination Options header, or when the Destination Options header in the IPv6 extension header of the session request comprises no CGA-related information, receive the CGA parameters and CGA signature returned by the first communication party, authenticate the CGA parameters and CGA signature, and establish communication with the first communication party if the authentication succeeds.

9. A method for establishing communication between at least two communication parties comprising a first communication party and a second communication party, comprising:
- sending, by the second communication party, a first Cryptographically Generated Address (CGA) request to the first communication party;
- receiving, by the second communication party, CGA parameters and a CGA signature of the first communication party which sent from the first communication party as a response to the first CGA request;
- authenticating, by the second communication party, the CGA parameters and the CGA signature, and establishing communication with the first communication party if the authentication succeeds;
- receiving, by the second communication party, a second CGA request sent by the first communication party when receiving the CGA parameters and the CGA signature of the first communication party;
- returning, by the second communication party, CGA parameters and CGA signature of the second communication party to the first communication party after authenticating the CGA parameters and CGA signature of the first communication party successfully; and
- establishing communication between the second communication party and the first communication party after the first communication party authenticates the CGA parameters and CGA signature of the second communication party successfully.

10. A communication device, comprising:
- a sending module, configured to send a first Cryptographically Generated Address (CGA) request to a second communication device;
- a receiving module, configured to receive CGA parameters and a CGA signature of the second communication device which sent from the second communication party as a response to the first CGA request;
- an authenticating module, configured to authenticate the CGA parameters and CGA signature received by the receiving module; and
- a communication establishing module, configured to establish communication with the second communication device if the authenticating module succeeds in the authentication;
- a CGA request receiving module, configured to receive a second CGA request sent by the second communication device when the receiving module receives the CGA parameters and CGA signature of the second communication device; and
- a CGA returning module, configured to return the CGA parameters and CGA signature of the communication device to the second communication device after the CGA request receiving module receives the second CGA request sent by the second communication device and the authenticating module authenticates the CGA parameters and CGA signature successfully.

* * * * *